US011808999B2

(12) United States Patent
Vallance et al.

(10) Patent No.: US 11,808,999 B2
(45) Date of Patent: *Nov. 7, 2023

(54) ELASTIC AVERAGING COUPLING

(71) Applicant: Senko Advanced Components, Inc., Hudson, MA (US)

(72) Inventors: Robert Ryan Vallance, Newbury Park, CA (US); Yang Chen, Thousand Oaks, CA (US); Tewodros Mengesha, Camarillo, CA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,815

(22) Filed: Nov. 11, 2022

(65) Prior Publication Data

US 2023/0076055 A1 Mar. 9, 2023

Related U.S. Application Data

(63) Continuation of application No. 17/167,068, filed on Feb. 3, 2021, now Pat. No. 11,500,166.

(Continued)

(51) Int. Cl.
  *G02B 6/42* (2006.01)
  *G02B 6/30* (2006.01)

(52) U.S. Cl.
  CPC .......... *G02B 6/423* (2013.01); *G02B 6/30* (2013.01); *G02B 6/4214* (2013.01); *G02B 6/4243* (2013.01)

(58) Field of Classification Search
  CPC ........ G02B 6/423; G02B 6/30; G02B 6/4214; G02B 6/4243
  See application file for complete search history.

(56) References Cited

U.S. PATENT DOCUMENTS

| 4,323,300 | A | * | 4/1982 | Stewart | G02B 6/3885 385/59 |
| 6,250,819 | B1 | * | 6/2001 | Porte | G02B 6/423 385/88 |

(Continued)

FOREIGN PATENT DOCUMENTS

| WO | WO-0159838 A1 | * | 8/2001 | ........... G02B 6/4232 |
| WO | WO-0190794 A1 | * | 11/2001 | ............. G02B 6/423 |
| WO | WO-0198806 A1 | * | 12/2001 | ............... G02B 6/26 |

*Primary Examiner* — Michelle R Connelly

(57) ABSTRACT

A passive optical alignment coupling between an optical connector having a first two-dimensional planar array of alignment features and a foundation having a second two-dimensional planar array of alignment features. One of the arrays is a network of orthogonally intersecting longitudinal grooves defining an array of discrete protrusions that are each in a generally pyramidal shape with a truncated top separated from one another by the orthogonally intersecting longitudinal grooves, and the other array is a network of longitudinal cylindrical protrusions. The cylindrical protrusions are received in the grooves, with protrusion surfaces of the cylindrical protrusions in contact with groove surfaces and the top of the discrete protrusions contacting the surface bound by the cylindrical protrusions. The optical connector is removably attachable to the foundation to define a demountable coupling, with the first array of alignment features against the second array of alignment features to define an elastic averaging coupling.

23 Claims, 10 Drawing Sheets

Related U.S. Application Data

(60) Provisional application No. 62/969,536, filed on Feb. 3, 2020.

(56) References Cited

U.S. PATENT DOCUMENTS

| | | | |
|---|---|---|---|
| 6,661,955 B1* | 12/2003 | Calvet | G02B 6/3582 977/932 |
| 7,619,312 B2* | 11/2009 | Krishnamoorthy | H01L 23/48 438/106 |
| 8,805,129 B2* | 8/2014 | Han | G02B 6/423 385/129 |
| 10,025,043 B2* | 7/2018 | Vallance | G02B 6/124 |
| 10,048,455 B2* | 8/2018 | Pfnuer | G02B 6/423 |
| 10,598,873 B2* | 3/2020 | Vallance | G02B 6/4225 |
| 11,036,015 B2* | 6/2021 | Shikama | G02B 6/4219 |
| 11,500,166 B2* | 11/2022 | Vallance | G02B 6/4214 |
| 2001/0055447 A1* | 12/2001 | Delprat | G02B 6/4228 385/52 |
| 2010/0247034 A1* | 9/2010 | Yi | G02B 6/423 385/52 |
| 2019/0137705 A1* | 5/2019 | Vallance | G02B 6/4249 |

\* cited by examiner

ELASTIC AVERAGING COUPLING

PRIORITY CLAIM

This application: (a) is a continuation of U.S. patent application Ser. No. 17/167,068 filed on Feb. 3, 2021; and (b) claims the priority of U.S. Provisional Patent Application No. 62/969,536 filed on Feb. 3, 2020. These applications are fully incorporated by reference as if fully set forth herein. All publications noted below are fully incorporated by reference as if fully set forth herein.

BACKGROUND OF THE INVENTION

Field of the Invention

The present invention relates to coupling of light into and out of optoelectronic components (e.g., photonic integrated circuits (PICs)), and more particular to the optical connection of optical fibers to PICs.

Description of Related Art

Photonic integrated circuits (PICs) or integrated optical circuits are part of an emerging technology that uses light as a basis of operation as opposed to an electric current. A PIC device integrates multiple (at least two) photonic functions and as such is analogous to an electronic integrated circuit. The major difference between the two is that a photonic integrated circuit provides functionality for information signals imposed on optical wavelengths typically in the visible spectrum or near infrared 850 nm-1650 nm.

PICs are used for various applications in telecommunications, instrumentation, and signal-processing fields. A PIC device (in the form of a photonic chip package) typically uses optical waveguides to implement and/or interconnect various on-chip elements, such as waveguides, optical switches, couplers, routers, splitters, multiplexers/demultiplexers, modulators, amplifiers, wavelength converters, optical-to-electrical (O/E) and electrical-to-optical (E/O) signal converters (e.g., photodiodes, lasers), etc. A waveguide in a PIC device is usually an on-chip solid light conductor that guides light due to an index-of-refraction contrast between the waveguide's core and cladding.

One of the most expensive components within photonic networks are the fiber-optic connectors. For proper operation, a PIC typically needs to efficiently couple light between an external optical fiber and one or more of on-chip waveguides. It is often necessary for PIC devices to have optical connections to other PIC devices, often in the form an organized network of optical signal communication. The connection distances may range from a several millimeters in the case of chip-to-chip communications up to many kilometers in case of long-reach applications. Optical fibers can provide an effective connection method since the light can flow within the optical fibers at very high data rates (>25 Gbps) over long distances due to low-loss optical fibers. For proper operation, a PIC device needs to efficiently couple light between an external optical fiber and one or more on-chip waveguides. An advantage of using light as a basis of circuit operation in a PIC device is that its energy cost for high-speed signal transmission is substantially less than that of electronic chips. Thus, efficient coupling between PIC devices and other optical devices, such as optical fibers, that maintains this advantage is an important aspect of PICs.

One approach to coupling optical fibers to a PIC device (or a PIC chip package) is to attach an optical fiber array to the edge of the PIC chip. Heretofore, optical fiber arrays are aligned to elements on the PICs using an active alignment approach in which the position and orientation of the optical fiber(s) is adjusted by machinery until the amount of light transferred between the fiber and PIC is maximized. This is a time-consuming process that is generally done after the PIC is diced from the wafer and mounted within a package. This postpones the fiber-optic connection to the end of the production process. Once the connection is made, it is permanent, and would not be demountable, separable or detachable without likely destroy the integrity of connection for any hope of remounting the optical fiber array to the PIC. In other words, the optical fiber array is not removably attachable to the PIC, and the fiber array connection, and separation would be destructive and not reversible (i.e., not reconnectable).

The current state-of-the-art attempts are to achieve stringent alignment tolerances using polymer connector components, but polymers have several fundamental disadvantages. First, they are elastically compliant so that they deform easily under external applied loads. Second, they are not dimensionally stable and can change size and shape especially when subjected to elevated temperatures such as those found in computing and networking hardware. Third, the coefficient of thermal expansion (CTE) of polymers is much larger than the CTE of materials that are commonly used in PIC devices. Therefore, temperature cycles cause misalignment between the optical fibers and the optical elements on the PIC devices. In some cases, the polymers cannot withstand the processing temperatures used while soldering PIC devices onto printed circuit boards.

In addition, it would be advantageous if the fiber-optic connections could be created prior to dicing the discrete PICs from the wafer; this is often referred to as wafer-level attachment. Manufacturers of integrated circuits and PICs often have expensive capital equipment capable of sub-micron alignment (e.g. wafer probers and handlers for testing integrated circuits), whereas companies that package chips generally have less capable machinery (typically several micron alignment tolerances which is not adequate for single-mode devices) and often use manual operations. However, it is impractical to permanently attach optical fibers to PICs prior to dicing since the optical fibers would become tangled, would be in the way during the dicing operations and packaging procedures, and are practically impossible to manage when the PICs are pick-and-placed onto printed circuit boards and then soldered to the PCBs at high temperatures.

US Patent Publication No. 2016/0161686A1 (commonly assigned to the assignee of the present application, and fully incorporated by reference herein) discloses demountable optical connectors for optoelectronic devices. The disclosed demountable optical connectors include implementation of an elastic averaging coupling to provide an improved approach to optically couple input/output of optical fibers to PICs which improves tolerance, manufacturability, ease of use, functionality and reliability at reduced costs. As is known in the prior art, elastic averaging represents a subset of surface coupling types where improved accuracy is derived from the averaging of error over a large number of contacting surfaces. Contrary to kinematic design, elastic averaging is based on significantly over-constraining the solid bodies with a large number of relatively compliant members. As the system is preloaded, the elastic properties of the material allow for the size and position error of each individual contact feature to be averaged out over the sum of contact features throughout the solid body. Although the repeatability and accuracy obtained through elastic averaging may not be as high as in deterministic systems, elastic averaging design allows for higher stiffness and lower local stress when compared to kinematic couplings. In a well-designed and preloaded elastic averaging coupling, the repeatability is approximately inversely proportional to the square root of the number of contact points.

Most PIC devices require single-mode optical connections that require stringent alignment tolerances between optical fibers and the PIC, typically less than 1 micrometer. Efficient optical coupling to and from the on-chip single-mode waveguides to an external optical fiber is challenging due to the mismatch in size between the single-mode waveguides and the light-guiding cores within optical fibers. For example, the dimension of a typical silica optical fiber is approximately forty times larger than a typical waveguide on a PIC. Because of this size mismatch, if the single mode waveguide and the optical fiber are directly coupled, the respective modes of the waveguide and optical fiber may not couple efficiently resulting in an unacceptable insertion loss (e.g., >20 dB).

US Patent Publication No. 2020/0124798A1 (commonly assigned to the assignee of the present application, and fully incorporated by reference herein) discloses demountable edge couplers with micro-mirror optical bench for PICs, which provide a mechanism to bring the mode sizes of the optical fibers in a fiber array and on-chip optical elements close to each other to effectuate efficient optical coupling input/output of optical fibers to PIC devices.

What is needed is an improved demountable optical coupling between connectors, based on an improved elastic averaging approach that further improves tolerance, manufacturability, ease of use, functionality and reliability at reduced costs.

SUMMARY OF THE INVENTION

The present invention overcomes the drawbacks of the prior art by providing a demountable/separable and reconnectable passive alignment coupling/connection that achieve high alignment accuracy. An optical connector (e.g., supporting or is a part of an optical bench that supports an optical fiber) is configured and structured to be non-destructively, removably attachable for reconnection to the foundation in alignment therewith. The foundation may be an integral part of the opto-electronic device (e.g., part of a photonic integrated circuit (PIC) chip), or a separate component attached to the opto-electronic device.

The present invention will be explained in connection with the illustrated embodiments. The foundation can be aligned to electro-optical elements (e.g., grating couplers, waveguides, etc.) in the optoelectronic device. The foundation is permanently positioned with respect to the opto-electronic device to provide an alignment reference to the external optical connector. The optical connector can be removably attached to the foundation, via a 'separable' or 'demountable' or 'detachable' action that accurately optically aligns the optical components/elements in the optical bench to the opto-electronic device along a desired optical path. In order to maintain optical alignment for each connect and disconnect and reconnect, this connector needs to be precisely and accurately aligned to the foundation. In accordance with the present invention, the connector and foundation are aligned with one another using a passive mechanical alignment, specifically, elastic averaging alignment, constructed from geometric features on the two bodies. With the foregoing as introduction, the present invention may be summarized below.

The present invention is directed to a passive optical alignment coupling for an optical connector and a foundation (e.g., associated with a PIC chip). The optical connector comprises a first body transmitting an optical signal. The first body defines a first base (which may support an optical fiber array) having a first, planar, surface defined with a first two-dimensional planar array of alignment features integrally defined on the first surface of the first base; and the foundation (which may be coupled to a photonic integrated circuit PIC) comprising a second body providing an alignment reference to an external optoelectronic device communicating optical signals with the optical connector. The second body defines a second base having a second, planar, surface defined with a second two-dimensional planar array of alignment features integrally defined on the second surface of the second base. One of the first array of alignment features and the second array of alignment features comprises a first network of orthogonally intersecting longitudinal open grooves, and the other one of the first array of alignment features and the second array of alignment features comprises a second network of longitudinal cylindrical protrusions (each may be a continuous cylindrical protrusion or a broken chain of cylindrical protrusions) each having a longitudinal axis parallel to corresponding one of the first surface of the first base or the second surface of the second base. (Alternatively, the alignment features on the optical connector and the foundation may be swapped.) The second network of cylindrical protrusions are received in the matching complementary first network of open grooves, with protrusion surfaces of the cylindrical protrusions in contact with groove surfaces of the longitudinal grooves. The optical connector is removably attachable to the foundation to define a demountable coupling, with the first array of alignment features against the second array of alignment features to define an elastic averaging coupling, thereby aligning the optical connector to the foundation.

In one embodiment, the first network of orthogonally intersecting longitudinal grooves of the first alignment features define an array of discrete protrusions separated and isolated from one another by the orthogonally intersecting longitudinal grooves on the first surface of the first base (or alternatively on the second surface of the second base), which are each in a generally pyramidal shape with a truncated top (e.g., a flat or slightly convex curved top). The array of discrete protrusions may comprise raised structures each symmetrical with respect to a first plane orthogonal to the corresponding one of the first surface of the first base and the second surface of the second base and further symmetrical with respect to a second plane orthogonal to the first plane and orthogonal to the corresponding one of the first surface and the second surface (i.e., the raised structures are each symmetrical along two orthogonal planes about a central axis orthogonal to the first surface of the first base of the optical connector (or alternatively on the second surface of the second base of the foundation).

In one embodiment, the second network of cylindrical protrusions comprises a network of intersecting longitudinal cylindrical protrusions (forming a cross-grid structure on the surface of the corresponding base), each may be, in one embodiment, substantially semi-circular profile in cross-section. Other convex curved cross-section (e.g., elliptic, parabolic, or gothic arch profiles) may be adopted.

In one embodiment, the protrusion surfaces of the longitudinal cylindrical protrusions are in line contact with the groove surfaces to define an array of line contacts when the optical connector is coupled to the foundation. In this embodiment, the longitudinal grooves are V-grooves, and each discrete protrusion comprises substantially flat surfaces corresponding to the groove surfaces so as to define the line contacts with the protrusion surfaces when the optical connector is coupled to the foundation. In another embodiment, the protrusion surfaces of the longitudinal cylindrical protrusions are in point contact with the groove surfaces to define an array of point contacts when the optical connector is coupled to the foundation. In this embodiment, each discrete protrusion comprises convex curved surfaces corresponding to the groove surfaces so as to define the point contacts with the protrusion surfaces when the optical connector is coupled to the foundation.

In one embodiment, the array of discrete protrusions is a rectangular array of (M+1)×(N+1) discrete protrusions corresponding to the first network of intersecting grooves comprising M×N orthogonally intersecting longitudinal grooves. The second network of cylindrical protrusions comprises M×N orthogonally intersecting longitudinal cylindrical protrusions, to match the first network of M×N intersecting longitudinal grooves. For a coupling interface between the first surface of the optical connector and the second surface of the foundation having a planar area of about 3 mm×3 mm, to achieve a coupling accuracy of less than 1 micrometer between the optical connector and the foundation, M is preferably in a range of 3 to 10 and N is in a range of 3 to 10.

In one embodiment, the discrete protrusions defined by the longitudinal grooves contact the corresponding one of the first surface and the second surface, when the optical connector is coupled to the foundation. Further, in one embodiment, to ensure the optical connector seats on the foundation in a predetermined unique position, the array of discrete protrusions further comprise a plurality of guide key protrusions having raised structures located along a perimeter/an edge of the first surface (or alternatively the second surface), which have a different surface profile at the surfaces facing away from the perimeter/edge (i.e., the surfaces not contacting a cylindrical protrusion when the optical connector is coupled to the foundation) as compared to the surface profile of the symmetrical discrete protrusions located interior of the perimeter/edge (i.e., the discrete protrusions that contacts the corresponding one of the first surface and the second surface). For example, some of the discrete protrusions at the perimeter of a 10×5 array of discreate protrusions (i.e., M=9 and N=4), e.g., at the corners (1, 1), (10, 1), (1, 5) and (10, 5), may each include a surface profile that is different from that of the discrete protrusions at interior locations away from the perimeter in the array (e.g., at (2, 2) to (9, 2), etc.). The shape of the corner protrusions would not fit in the interior spaces bound by cylindrical protrusions on four sides on the opposing surface. The corner protrusions would fit only into the spaces at the corners on the opposing surface since they are not bound by cylindrical protrusions. Hence, guide keys are provided at the coupling interface to initially guide the mating of the first array of alignment features and the second array of alignment features, so as to uniquely seat the relative position of the complementary alignment features to couple the optical connector to the foundation in a predetermined intended relative position.

In one embodiment, the first base comprises a first malleable metal material and the first array of alignment features of the optical connector are integrally defined on the first base by stamping the malleable metal material, and the second base comprises a second malleable material and the second array of alignment features are integrally defined on the base by stamping the second malleable metal material.

In one embodiment, the optical connector further comprises a first micro-mirror optical bench, which comprises the first base; a first array of mirrors defined on the first base, wherein each mirror includes a structured reflective surface profile that turns light between a first light path, along a first direction in a first plane substantially parallel to the first surface of the first base, and a second light path, along a second direction outside the first plane; and an array of fiber grooves defined on the first base each receiving a section of optical fiber with its longitudinal axis along the first light path, with an end in optical alignment with a corresponding mirror along the first light path. In one embodiment, the foundation comprises a second micro-mirror optical bench, which comprises: the second base; and a second array of mirrors defined on the second base, wherein each mirror in the second array of mirrors includes a structured reflective surface profile that turns light between a third light path, along a third direction in a second plane substantially parallel to the second surface of the second base, and a fourth light path, along a fourth direction outside the second plane. In one embodiment, the first array of mirrors and the first array of alignment features are simultaneously defined on the first base by stamping a first body of metal blank and the second array of mirrors and the second array of alignment features are simultaneously defined on the second base by stamping a second body of metal blank. By high-precision stamping to integrally/simultaneously form the passive alignment features and/or the micro optical bench (MOB) on the foundation and the optical connector, the components can be produced economically in high or small volumes, while improving tolerance, manufacturability, ease of use, functionality and reliability. The foundation and/or optical bench components should be made of a stampable materials like ductile metals such as Kovar, Invar, stainless steel, aluminum. Preferably, the optical bench and foundation should both have similar coefficients of thermal expansion (CTEs), so that misalignment does not occur during temperature cycles and stress/strains are not generated.

In one embodiment, the first base of the optical connector has a first reference surface at a first side of the first base and the second base of the foundation has a second reference surface at a second side of the second base. The first reference surface and the second reference surface are generally aligned by a compliant clip biasing the first base against the second base with the first array of alignment features against the second array of alignment features.

In accordance with the present invention, the optical connector and the foundation define a free space coupling without any refractive optical element disposed between the optical connector and the foundation to provide reshaping of light. Further, the demountable elastic averaging coupling between the optical connector and the foundation is defined without use of any complementary alignment pin and alignment hole.

The inventive elastic averaging coupling of the present invention may be deployed in a photonic apparatus. In one embodiment, the photonic apparatus comprises a support; an optoelectronic device attached to a top surface of the support; and a passive optical alignment comprising the inventive elastic averaging coupling. The foundation is positioned relative to the optoelectronic device, either on the optoelectronic device and/or the support, to define an aligned position for the optoelectronic device to communicate optical signals with the optical connector removably/demountably coupled to the foundation. The optoelectronic device may comprise a photonic integrated circuit (PIC) chip comprising optical elements as an optical interface to external of the PIC chip. The foundation is in optical alignment with the optical elements of PIC chip.

In one embodiment, the foundation comprises an edge coupler supported on the support in optical alignment with respect to the PIC chip. The optical elements of the PIC chip route light to an edge of the PIC chip. The edge coupler may comprise an array of mirrors in optical alignment with the optical elements of the PIC chip, and light is transmitted along a light path between a mirror in the array of mirrors and a corresponding optical element in the PIC chip.

The present invention is also directed to a method for providing a demountable connection between an optical connector and an optoelectronic device, comprising providing a support; attaching the optoelectronic device to a top surface of the support; and providing a passive optical alignment coupling as in any of the above claims, wherein the foundation is positioned relative to the optoelectronic device, either on the optoelectronic device and/or the support, and wherein the foundation defines an aligned position for the optoelectronic device to communicate optical signals with the optical connector that is demountably coupled to the foundation.

In one embodiment, the optical connector is first coupled to the foundation. The optical connector is actively aligned to the optoelectronic device by positioning the foundation relative to the optoelectronic device (e.g., a PIC chip or an optical I/O chip) to obtain an optimum optical signal between the optoelectronic device and the optical connector (e.g., optical fibers supported by the optical connector). The location of the foundation is secured with respect to the optoelectronic device at the aligned position (e.g., using a solder to tack the position of the foundation on a support for the optoelectronic device, such as an interposer, a printed circuit board, a submount, etc.). The optical connector is then demounted from the foundation, and the foundation can be permanently attached to the support (e.g., reflowing the solder) without changing its position on the support. Thereafter, the optical connector can be repeatedly connected and disconnected and reconnected to the foundation non-destructively without losing the original optical alignment obtained by active alignment between the optical connector and the optoelectronic device. Optical alignment in accordance with original active alignment is maintained for each connect and disconnect and reconnect, to precisely and accurately align the optical connector to the foundation.

In one embodiment, the foundation may be an integral part of the optoelectronic device or the support for the optoelectronic device.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention overcomes the drawbacks of the prior art by providing a demountable/separable and reconnectable passive alignment coupling/connection that achieve high alignment accuracy. An optical connector (e.g., supporting or is a part of an optical bench that supports an optical fiber) is configured and structured to be non-destructively, removably attachable for reconnection to the foundation in alignment therewith. The foundation may be an integral part of the opto-electronic device (e.g., part of a photonic integrated circuit (PIC) chip), or a separate component attached to the opto-electronic device.

The elastic averaging coupling concept of the present invention is discussed hereinbelow by reference to the example of a PIC as an optoelectronic device and an optical connector comprising an optical bench, and optically coupling an input/output end of an optical component (e.g., an optical fiber) supported in the optical bench with the optoelectronic device. The present invention may be applied to provide removable/reconnectable form structures and parts used in other fields.

Figure 1A:
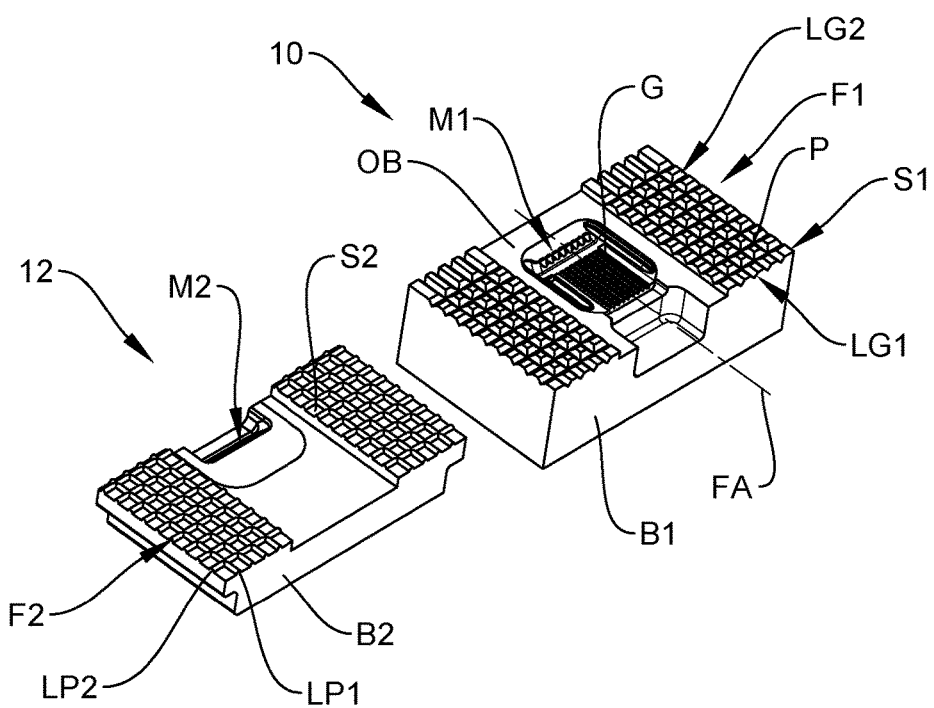
FIGS. 1A to 1C illustrate passive alignment features of an optical connector and a foundation, in accordance with one embodiment of the present invention.
Figure 1B:
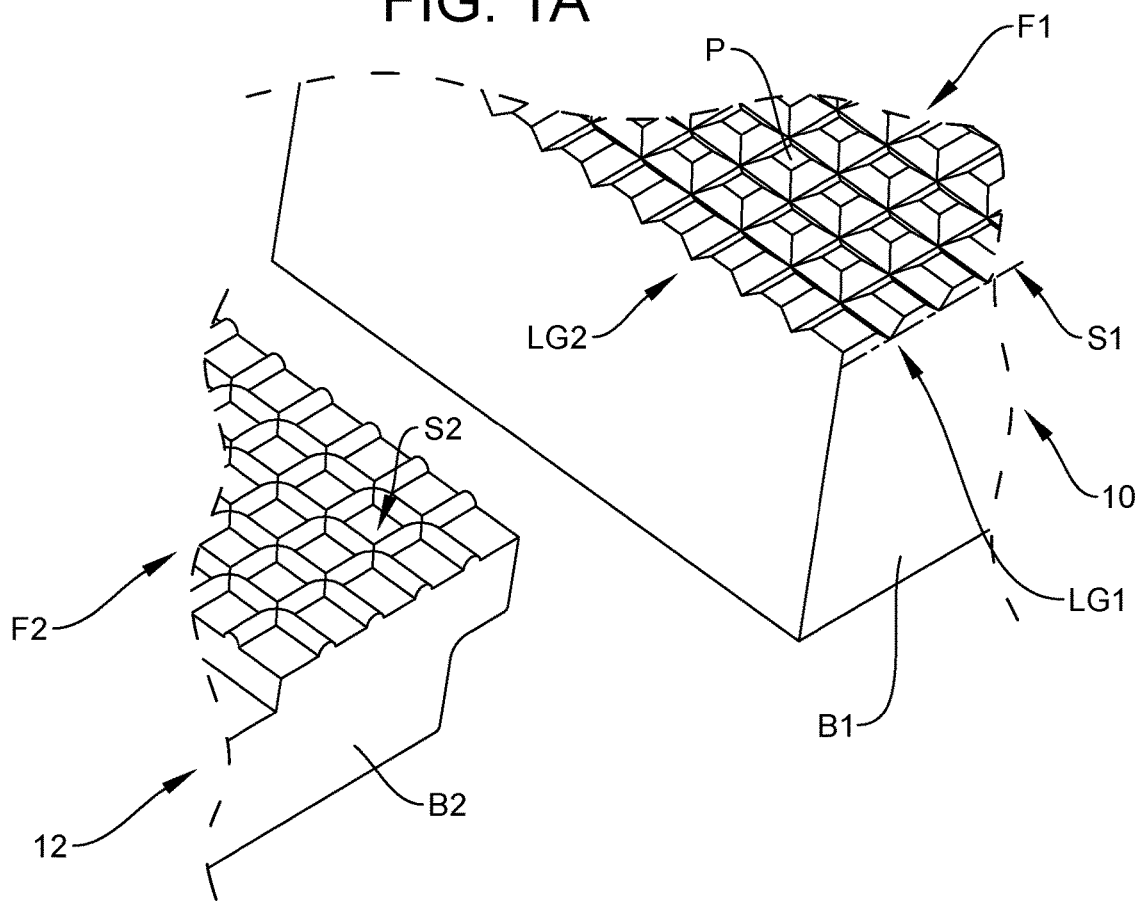
Figure 1C:
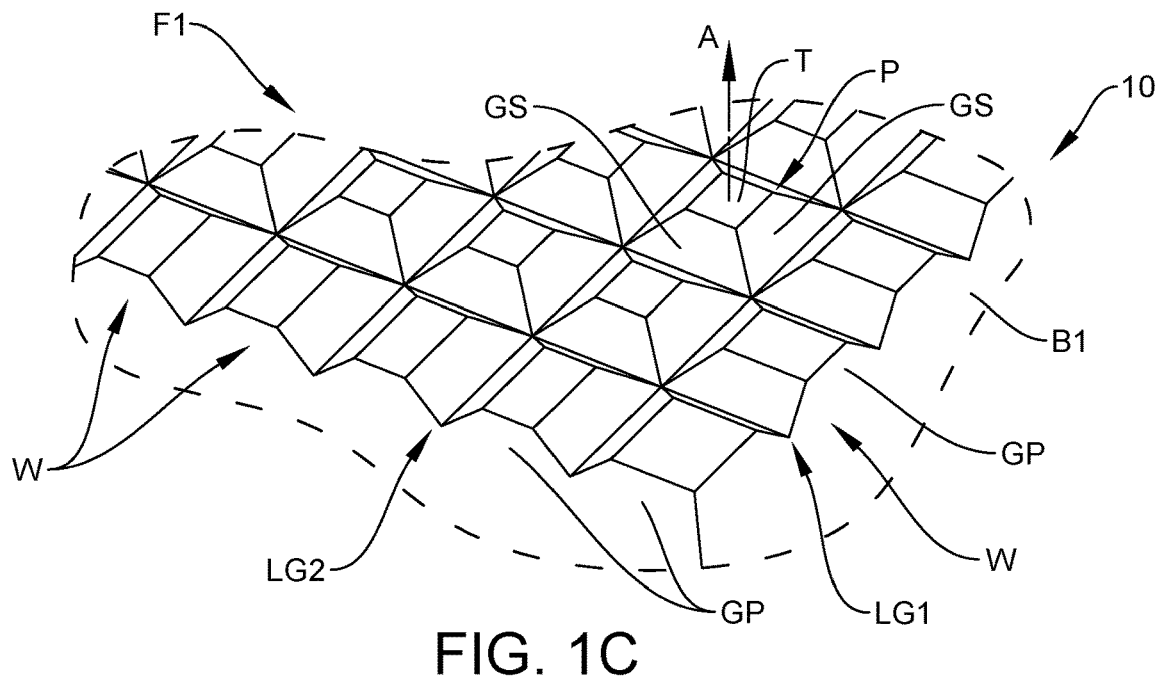

FIGS. 1A to 1C illustrate passive alignment features of an optical connector 10 and a foundation 12, in accordance with one embodiment of the present invention. The optical connector 10 comprises a first body B1 supporting an optical fiber array (schematically shown by dotted line FA) transmitting an optical signal. The foundation 12 comprises a second body B2 providing an alignment reference to an external optoelectronic device (e.g., a PIC chip 100 in FIG. 7, or an I/O PIC chip 101 for the ASIC chip (e.g. CPU, GPU, switch ASIC) 102 in FIG. 8) communicating optical signals with optical fiber OF in the optical connector 10.

Figure 6A:
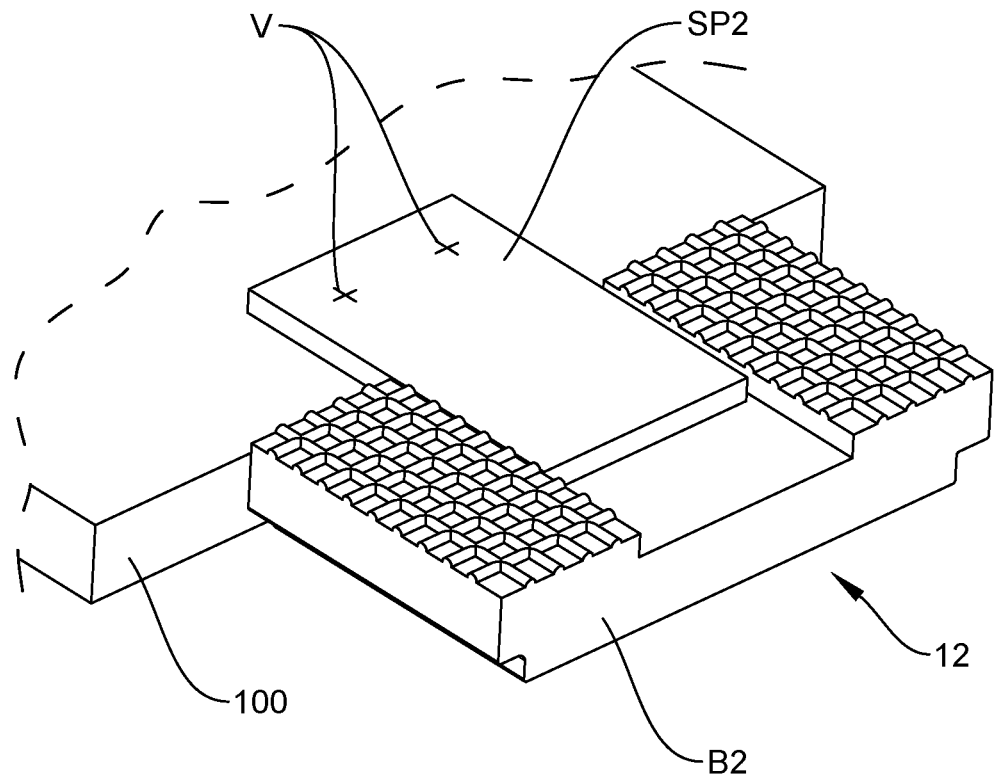
FIGS. 6A and 6B illustrate positioning of a foundation as an edge coupler to a PIC chip, in accordance with one embodiment of the present invention.

The first body of the connector 10 defines a first base B1 supporting the optical fiber array FA having a first, planar, surface S1 defined with a first two-dimensional planar array of alignment features F1 integrally defined on the first surface S1 of the first base B1. In this embodiment, the connector 10 incorporates a micro optical bench OB for supporting and aligning the optical fiber array FA. The optical fiber array FA has a plurality of optical fibers OF protected by protective buffer and matrix/jacket layers P. The base B1 of the connector 10 defines structured features including an alignment structure comprising open grooves G for retaining bare sections of optical fibers OF (having cladding exposed, without protective buffer and matrix/jacket layers J), and structured reflective surfaces (e.g., eight mirrors M1) having a plane inclined at an angle relative to the greater plane of the base B1. The open grooves G are sized to receive and located to precisely position the end section of the optical fibers OF in alignment with respect to a first array of mirrors M along a first optical path L1. The end face (input/output end) of each of the optical fibers OF is maintained at a pre-defined distance with respect to a corresponding mirror M1. In the embodiment of FIG. 6A, a transparent glass, quartz, or sapphire plate cover SP1 covers the exposed surfaces on the optical bench OB to protect the mirrors M1. In one embodiment, the connector 10 may be filled with index-matching epoxy between the mirror surfaces M1 and the plate cover SP1.

In one embodiment, each mirror M1 is an exposed free surface of the base B1 (i.e., surface exposed to air, or not internal within the body of the base of the optical bench) having an exposed reflective free side facing away from the base B1. The exposed reflective free side comprises a structured reflective surface profile at which light is directed to and from the optical fiber OF and to and from the foundation 12. Each mirror M1 bends, reflects and/or reshapes an incident light. Depending on the geometry and shape (e.g., curvature) of the structured reflective surface profile, the mirrors M may collimate, expand, or focus an incident light beam. For example, the structured reflective surface profile may comprise one of the following geometrical shape/profiles: (a) ellipsoidal, (b) off-axis parabolic, or (c) other free-form optical surfaces. For example, the mirror surface, to provide optical power, may have a surface geometrical curvature function of any of the following, individually, or in superposition: ellipsoidal or hyperbolic conic foci, toroidal aspheric surfaces with various number of even or odd aspheric terms, X-Y aspheric curves with various number of even or off terms, Zernike polynomials to various order, and various families of simpler surfaces encompassed by these functions. The surfaces may also be free-form surfaces with no symmetry along any plane or vector. The mirrors M may be defined on the base B by stamping a malleable metal material. Various malleable metals, stampable with tool steels or tungsten carbide tools, may compose the body of the mirrors, including any 300 or 400 series stainless steel, any composition of Kovar, any precipitation or solution hardened metal, and any alloy of Ag, Al, Au, Cu. At the long wavelengths above 1310 nm, aluminum is highly reflective (>98%) and economically shaped by stamping. The reflective surface of the portion of the metal comprising the mirror may be any of the metals mentioned above, or any coating of highly reflective metal, applied by sputtering, evaporation, or plating process.

U.S. Pat. No. 7,343,770, commonly assigned to the assignee of the present invention, discloses a novel precision stamping system for manufacturing small tolerance parts. Such inventive stamping system can be implemented to produce the structures of the connector 10 and the foundation 12 disclosed herein (including the structures for the optical bench OB discussed above, as well as the structures discussed below). These stamping processes involve stamping a malleable bulk metal material (e.g., a metal blank or stock), to form the final surface features at tight (i.e., small) tolerances, including the reflective surfaces having a desired geometry in precise alignment with the other defined surface features. U.S. Patent Application Publication No. US2016/0016218A1, commonly assigned to the assignee of the present invention, further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the bulk material that is subjected to stamping is a homogenous material (e.g., a strip of metal, such as Kovar, aluminum, etc.). The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses.

The overall functional structures of the optical bench OB generally resemble the structures of some of the optical bench embodiments disclosed in the assignee's earlier patent documents noted above (i.e., fiber alignment grooves aligned with structured reflective surfaces, and addition features to facilitate proper optical alignment). The earlier disclosed composite structure and stamping technology may be adopted to produce the connector 10 including the mirrors M1 in the optical bench OB, the grooves G and the first array of alignment features F1, and further the foundation 12 including the mirrors M2 and the second array of alignment features F2 discussed below. The respective alignment features F1 and F2 are formed on the respective planar surfaces S1 and S2, which facilitates alignment and/or accurate positioning the connector 10 with respect to the foundation 12, and hence with respect to the PIC chip 100/chip 102 or I/O chip 101, as will be explained later below.

The mirror M1 surface and optical fiber alignment structure in the optical connector can be integrally/simultaneous formed by precision stamping of a stock material (e.g., a metal blank or strip), which allows the connector components to be produced economically in high or small volumes, while improving tolerance, manufacturability, ease of use, functionality and reliability. By forming the structure reflective surface, the passive alignment features (discussed below) and the optical fiber alignment structure simultaneously in a same, single final stamping operation, dimensional relationship of all features requiring alignment on the same work piece/part can be maintained in the final stamping step. Instead of a punching operation with a single strike of the punch to form all the features on the optical bench, it is conceivable that multiple strikes may be implemented to progressive pre-form certain features on the optical bench, with a final strike to simultaneously define the final dimensions, geometries and/or finishes of the various structured features on the optical bench, including the mirror, optical fiber alignment structure/groove, passive alignment features discussed below, etc. that are required to ensure (or play significant role in ensuring) proper alignment of the respective components/structures along the design optical path.

Essentially, for the optical connector 10, the base B1 defines an optical bench OB for aligning the optical fibers OF with respect to the mirrors M1. By including the fiber grooves G on the same, single structure that also defines the mirrors M, the alignment of the end sections of the optical fibers OF to the mirrors M1 can be more precisely achieved with relatively smaller tolerances by a single final stamping to simultaneous define the final structure on a single part, as compared to trying to achieve similar alignment based on features defined on separate parts or structures, or based on separate forming steps. By forming the mirrors M1, the optical fiber alignment grooves G simultaneously in a same, single final stamping operation, dimensional relationship of all features/components requiring (or play a role in providing) alignment on the same work piece/part can be maintained in the final stamping step. Further, by the same token, the first array of alignment features F1 can also be formed with the mirrors M1 and the grooves G simultaneously in a same, single final stamping operation to maintain dimensional relationship of all the features (i.e., grooves G, mirrors M1 and alignment features F1) to achieve a desired alignment with a small tolerance.

In the illustrated embodiment in FIGS. 1A to 1C, the first array of alignment features F1 of the connector 10 comprises a first network of orthogonally intersecting longitudinal open groove LG1 and longitudinal open groove LG2, which are each a V-groove with flat walls. In one embodiment, the first network of orthogonally intersecting longitudinal grooves LG1 and LG2 of the first alignment features F1 define an array of discrete protrusions P separated and isolated from one another by the orthogonally intersecting longitudinal grooves LG1 and LG2 on the first surface S1 of the first base B1, which are each in a generally pyramidal shape with four flat sloping surfaces GS and a truncated top T (e.g., a flat or slightly convex curved top). The tops T of the protrusion P conforms generally to the first surface S1. Each discrete protrusions P (with the exception of the ones at the corners and/or at the edges, as further explained below) is a raised structure symmetrical with respect to a first plane orthogonal to the first surface S1 of the first base B1 and further symmetrical with respect to a second plane orthogonal to the first plane and orthogonal to the first surface S1 (i.e., the raised structures are each symmetrical along two orthogonal planes about a central axis A orthogonal to the first surface S1 of the first base B1). The features of the protrusions P are better depicted in the enlarged view in FIG. 1C. US Patent Publication No. 2020/0124798A1 (commonly assigned to the assignee of the present application, and fully incorporated by reference herein) discloses demountable edge couplers with micro-mirror optical bench for PICs, which provide a mechanism to bring the mode sizes of the optical fibers in a fiber array and on-chip optical elements close to each other to effectuate efficient optical coupling input/output of optical fibers to PIC devices. The foundation 12 herein has a structure similar to the edge coupler, and in fact could be structured similar to the edge coupler disclosed earlier therein, except for the passive alignment features on the foundation 12 as compared to the passive alignment features disclosed therein.

Figure 6B:
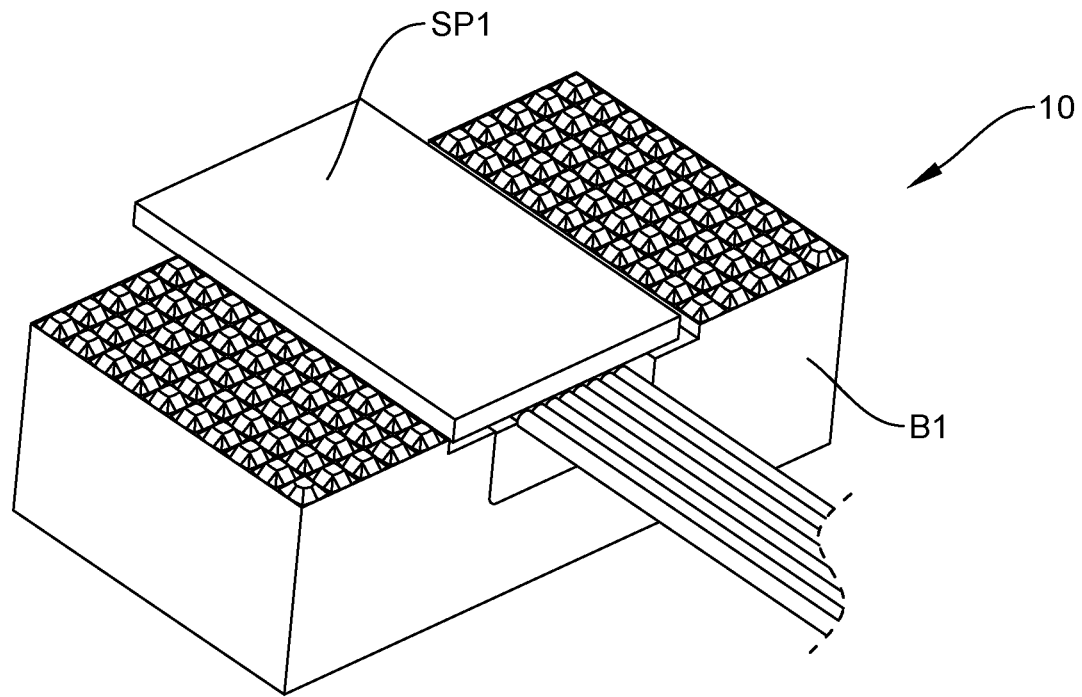

Referring to FIGS. 1A and 1B, the foundation 12 comprises a body having a base B2 (e.g., made of silicon, glass, a malleable metal such as Kovar, Invar, aluminum, stainless steel) with a second array of mirrors M2 defined on the base B2. In the embodiment of FIG. 6B, a transparent glass, quartz, or sapphire plate cover SP2 covers the exposed surfaces on the base B2. In one embodiment, the foundation 12 may be filled with index-matching epoxy between the mirror surfaces M2 and the plate cover SP2. The structure of the mirrors M2 on the base B2 of the foundation 12 is quite similar to the corresponding structure of the mirrors M1 on the base B1 of the connector 10. The optical geometries of the respective mirrors M1 and M2 are chosen to implement the desired optical path. In the illustrated embodiment, the foundation 12 does not include any optical fiber as compared to the connector 10. However, the base B2 may further define grooves receiving short sections of optical fibers (not shown) as waveguides communicating light signals to and from the mirrors B2, as was in the case of the edge couplers disclosed in US Patent Publication No. 2020/0124798A1.

The base B2 of the foundation 12 has a second, planar, surface S2 defined with a second two-dimensional planar array of alignment features F2 integrally defined on the second surface S2 of the second base B2. The second array of alignment features F2 of the foundation 12 comprises a second network of longitudinal cylindrical protrusions (each may be a continuous cylindrical protrusion or a broken chain or a row of separate cylindrical protrusions in a common axial direction of the separate cylindrical protrusions) each having a longitudinal axis parallel to corresponding one of the second surface S2 of the second base B2. In this illustrated embodiment, the second network of cylindrical protrusions comprises a network of intersecting longitudinal cylindrical protrusions LP1 and longitudinal cylindrical protrusions LP2 (forming cross-grid protruded structure as shown in FIGS. 1A and 1B), each having a substantially semi-circular profile in cross-section. Other convex curved cross-section (e.g., elliptic, parabolic, or gothic arch profiles) may be adopted.

Figure 2A:
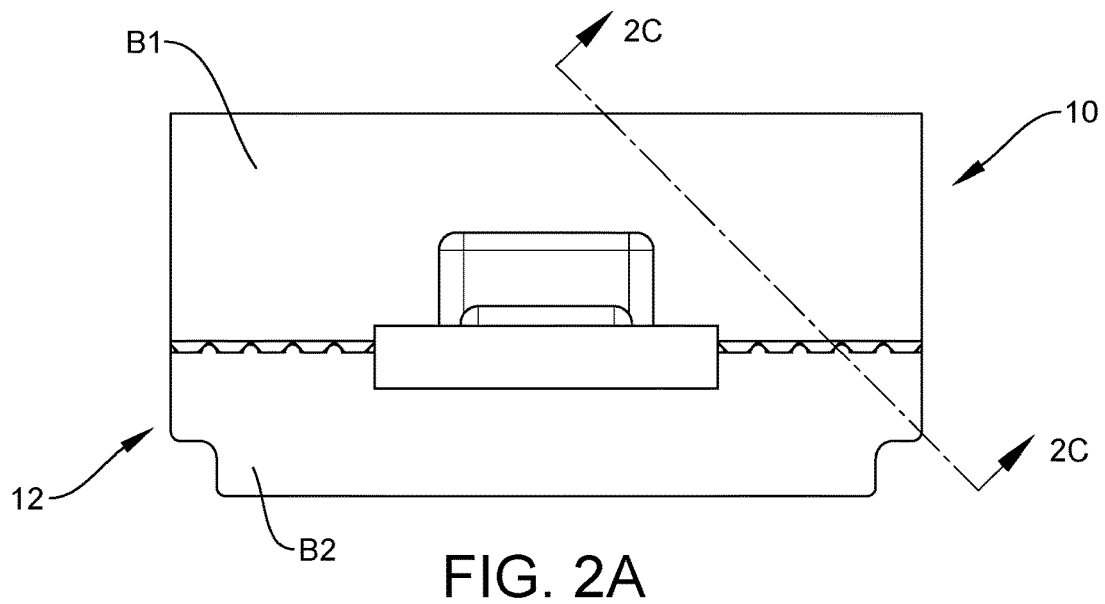
FIGS. 2A to 2D illustrate elastic averaging coupling interface of the optical connector to the foundation, in accordance with one embodiment of the present invention.
Figure 2B:
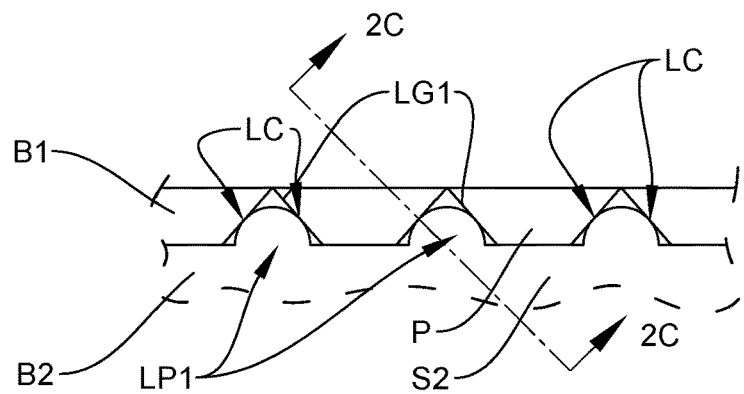
Figure 2C:
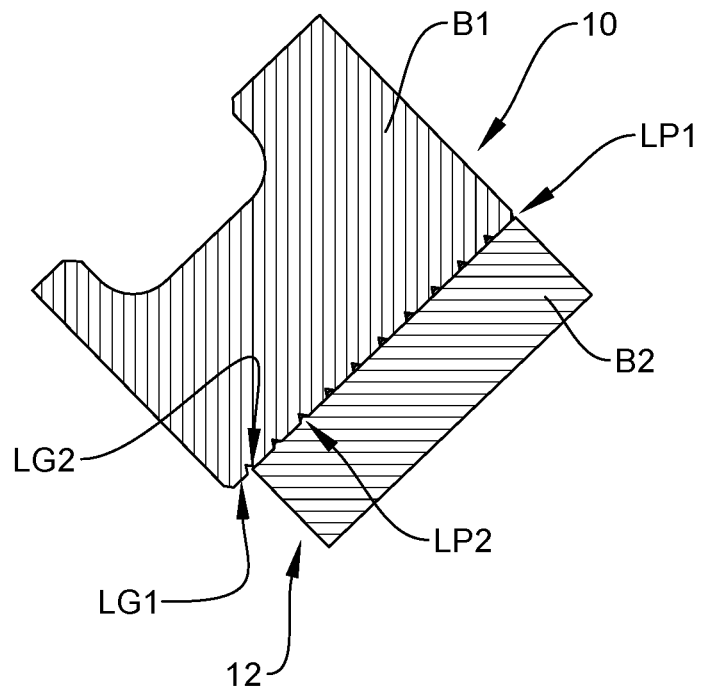
Figure 2D:
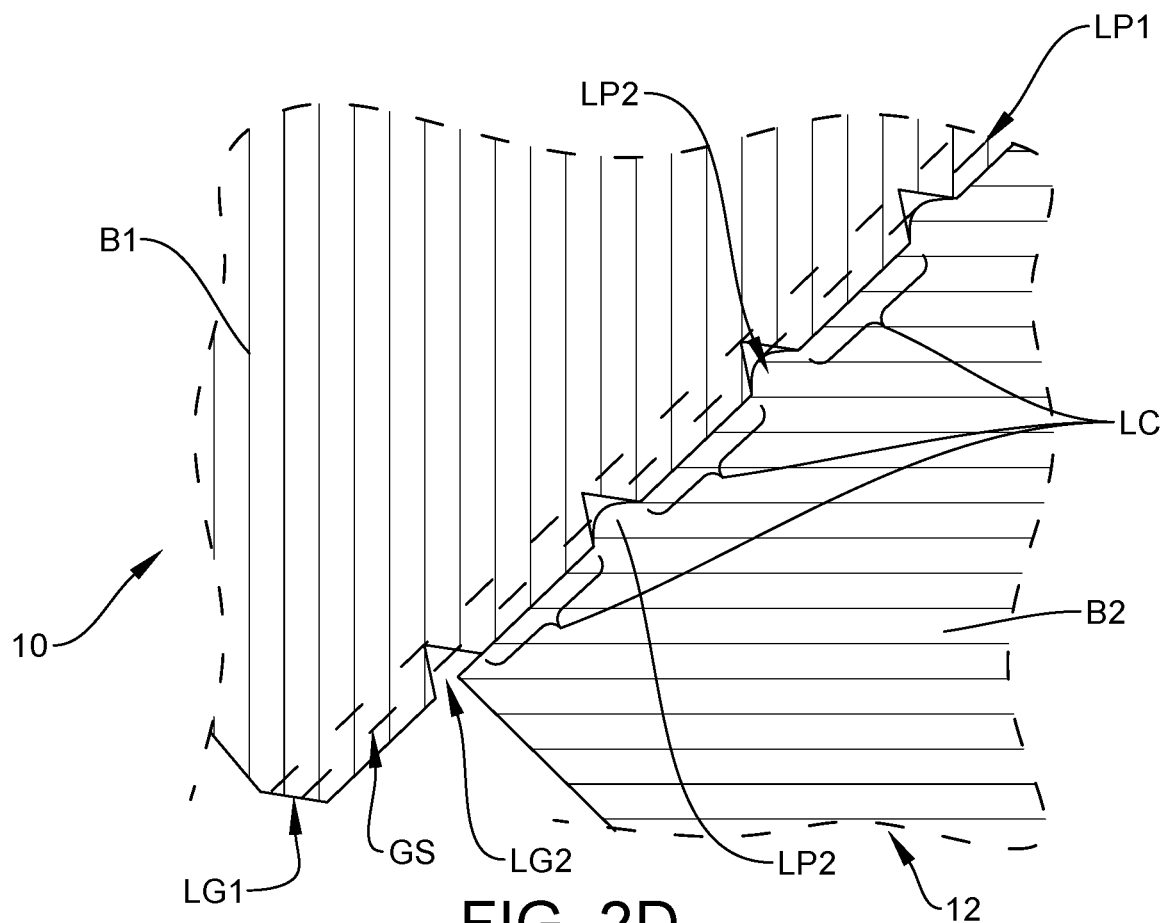

FIGS. 2A to 2D illustrate elastic averaging coupling interface of the optical connector to the foundation, in accordance with one embodiment of the present invention. FIG. 2A is a view of the coupling of the connector 10 on the foundation 12 viewed at an end in a direction along the longitudinal axis of the optical fiber OF. FIG. 2A is an enlarged view of the contact surfaces between the first and second arrays of alignment features. FIGS. 2C and 2D (an enlarged sectional view) show the sectional view taken along line 2C-2C in FIGS. 2A and 2C. The second network of orthogonal cylindrical protrusions LP1 and LP2 are received in the complementary matching first network of orthogonal open grooves LG1 and LG2. The protrusion surfaces of the cylindrical protrusions LP1 and LP2 contact the groove surfaces GS of the longitudinal grooves LG1 and LG2.

As can be seen in FIG. 2B, the longitudinal grooves LG1 are each a V-groove having flat groove wall surfaces in its longitudinal direction, and each discrete protrusion P comprises substantially flat sloping surfaces corresponding to the V-groove surfaces. The flat surfaces of the V-grooves LG1 and the convex curved surfaces of the cylindrical protrusions LP1 define line contacts LC between adjacent cylindrical protrusions LP2 (as depicted in FIGS. 2C and 2D) when the optical connector 10 is coupled to the foundation 12. Hence, the protrusion surfaces of the network of intersecting longitudinal cylindrical protrusions LP1 and LP2, being a straight surface in their respective longitudinal direction, are in line contact with the flat surfaces of the network of intersecting longitudinal grooves LG1 and LG2 to define an array of line contacts LC when the optical connector 10 is coupled to the foundation 12. The plurality of line contacts corresponds to an elastic averaging coupling so that the optical connector 10 can be removably attachable to the foundation to define a demountable coupling, with the first array of alignment features F1 against the second array of alignment features F2 to define an elastic averaging coupling, thereby aligning the optical connector to the foundation. It is noted that to achieve line contacts LC, the cylindrical protrusions LP1 and LP2 each may be a broken chain of discrete/isolated cylindrical protrusions along an axial direction parallel to the base B2 of the foundation 12, as long as a cylindrical protrusion surface is present in the region of interface with the flat surfaces GS of each discrete protrusions P. In other words, the cylindrical protrusions LP1 and LP2 do not need to be physically intersecting to form the cross-grid structure as shown in FIGS. 1A and 1B.

Figure 3A:
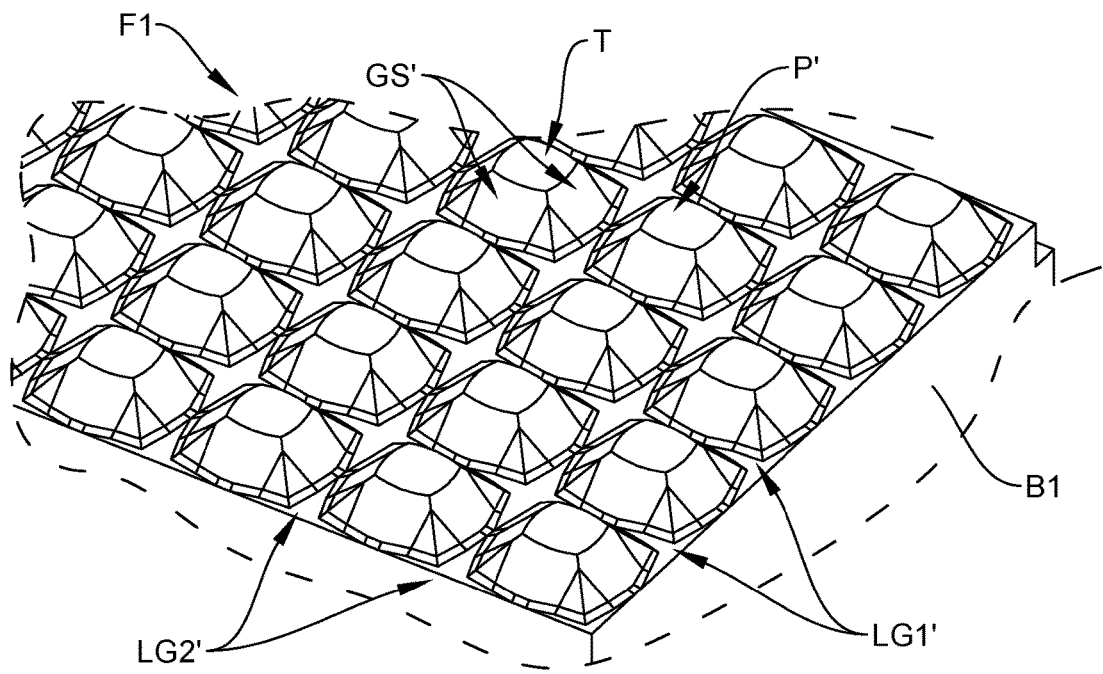
FIGS. 3A and 3B illustrate passive alignment features of an optical connector and a foundation, in accordance with another embodiment of the present invention.
Figure 3B:
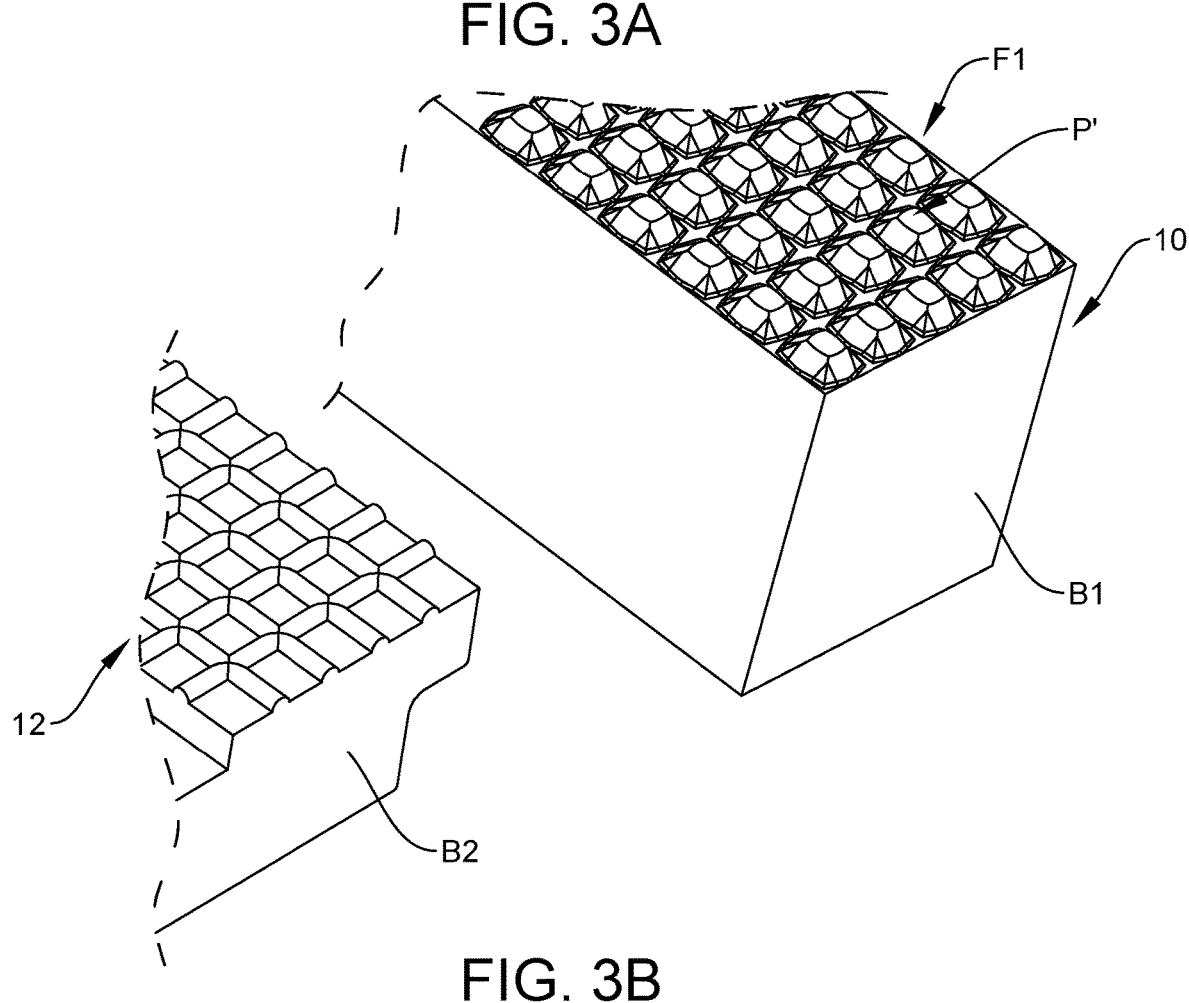

FIGS. 3A and 3B illustrate passive alignment features of an optical connector and a foundation, in accordance with another embodiment of the present invention. In this embodiment, the foundation 12 remains similar to the embodiment depicted in FIG. 1. The connector 10 is generally similar to the previous embodiment, with modifications to the structures of the intersection longitudinal grooves LG1' and LG2' and the discrete protrusions P'. The protrusions P' are each of a generally pyramidal shape, having convex curved surfaces GS' corresponding to the groove surfaces GS' and a flat or convex top T. The intersecting longitudinal grooves LG1' and LG2' are no longer V-grooves with flat wall surfaces as is the case in the previous embodiment of FIG. 1. In this embodiment, the longitudinal grooves LG1' and LG2' are generally V-shaped grooves each having side walls with convex surfaces corresponding to the protrusions P'. In particular, the protrusions P' has sloping surfaces GS' that is convex at least in the direction along the longitudinal grooves. It is noted that the sloping surfaces GS' may also curve in the height direction or in a direction of the slope, or a combination thereof.

FIGS. 4A to 4D illustrate elastic averaging coupling interface of the optical connector 10 to the foundation 12, in accordance with the embodiment of FIGS. 3A and 3B. The views in FIG. 4 corresponds to the views in FIG. 2 discussed above, which provide comparison to the previous embodiment.

Figure 4A:
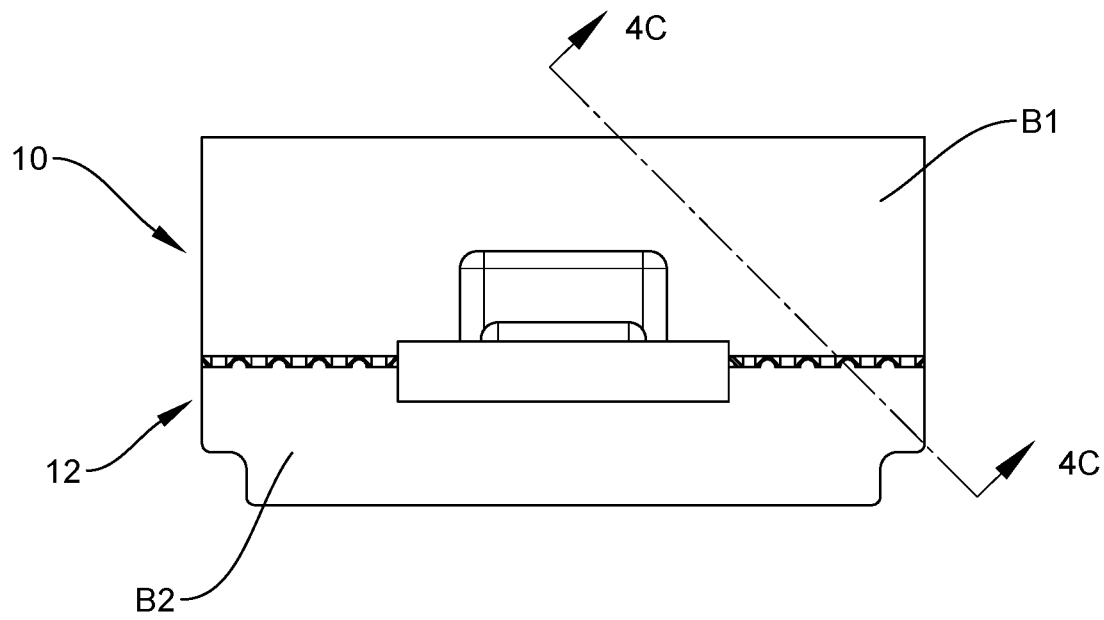
FIGS. 4A to 4D illustrate elastic averaging coupling interface of the optical connector to the foundation, in accordance with another embodiment of the present invention.
Figure 4B:
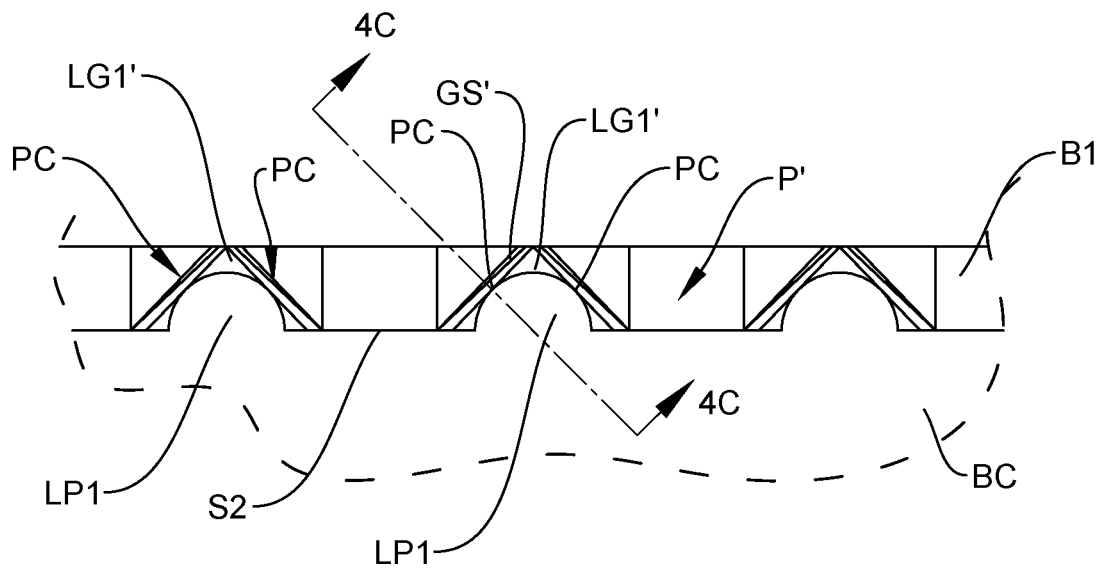
Figure 4C:
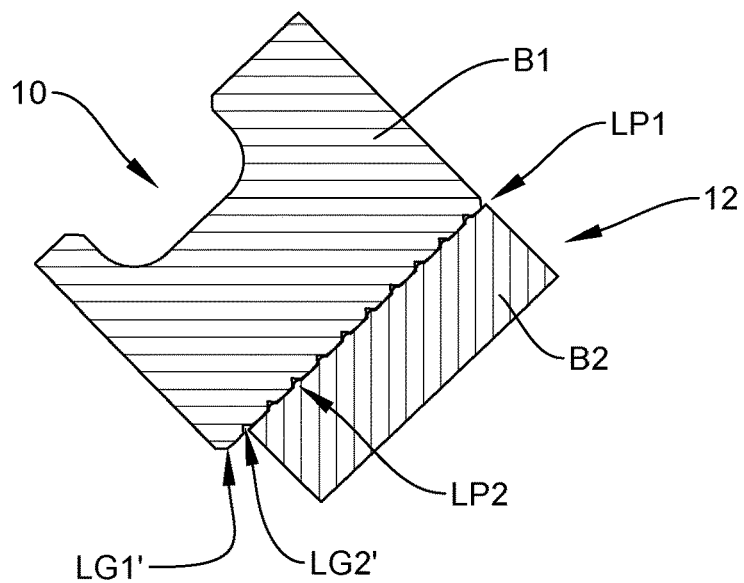
Figure 4D:
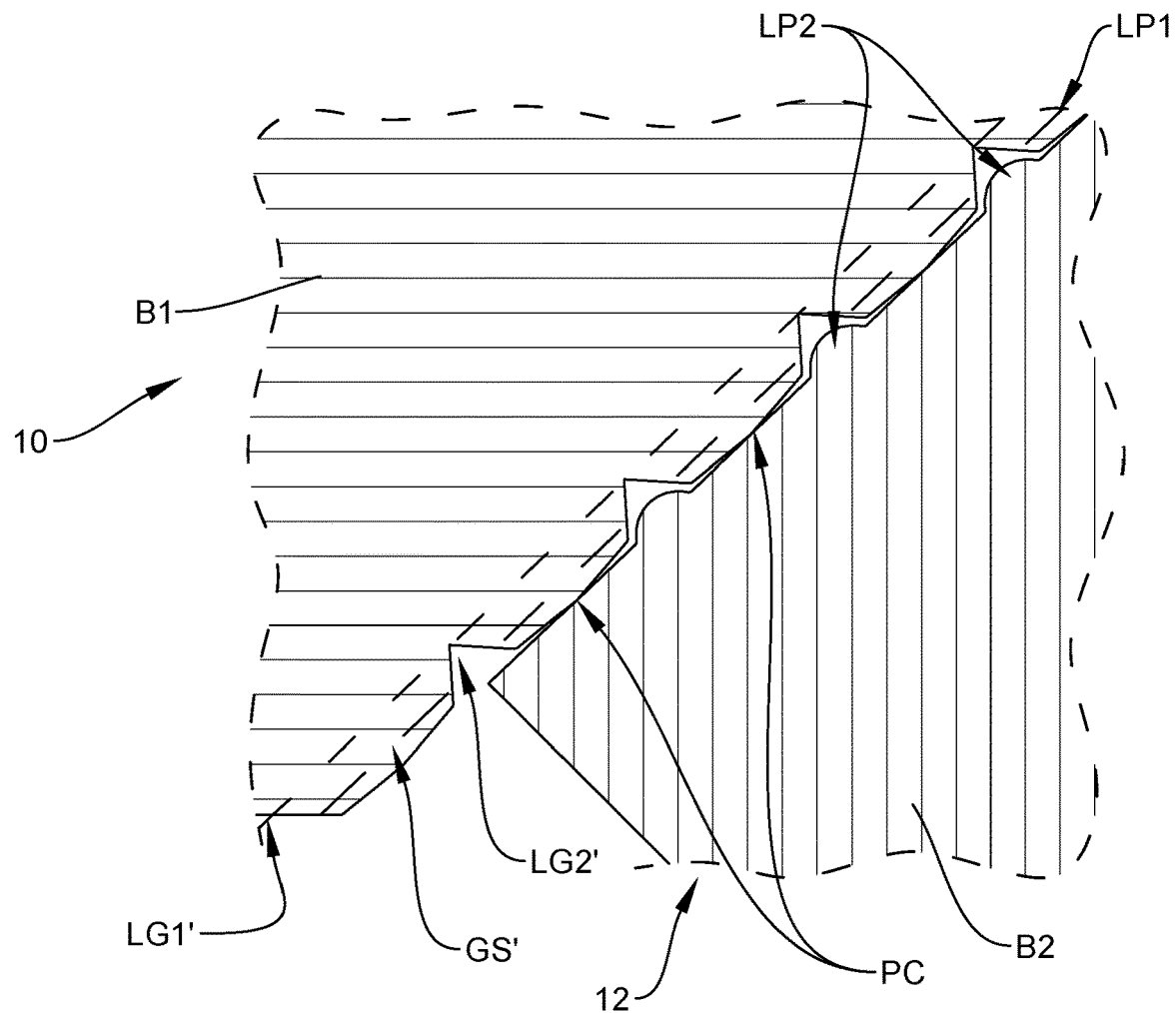

As can be in FIG. 4B, the longitudinal grooves LG1' are each a generally V-shaped grooves, and each discrete protrusion P' comprises convex sloping surfaces GS' corresponding to the groove surfaces GS'. The convex surfaces GS' of the grooves LG1' and the convex curved surfaces of the cylindrical protrusions LP1 define point contacts PC between adjacent cylindrical protrusions LP2 (as depicted in FIGS. 4C and 4D) when the optical connector 10 is coupled to the foundation 12. Hence, the protrusion surfaces of the network of intersecting longitudinal cylindrical protrusions LP1 and LP2, being a straight surface in their respective longitudinal direction, are therefore in point contact with the convex surfaces GS' of the network of intersecting longitudinal grooves LG1' and LG2', to define an array of line contacts PC when the optical connector 10 is coupled to the foundation 12. The plurality of point contacts PC correspond to an improved elastic averaging coupling so that the optical connector 10 can be removably attachable to the foundation to define a demountable coupling, with the first array of alignment features F1 against the second array of alignment features F2 to define an elastic averaging coupling, thereby aligning the optical connector to the foundation. It is noted that given the point contacts PC, the cylindrical protrusions LP1 and LP2 each may be a broken chain of discrete/isolated cylindrical protrusions along an axial direction parallel to the base B2 of the foundation, as long as a cylindrical protrusion surface is present in the region of interface with the convex surfaces GS' of each discrete protrusions P'. In other words, the cylindrical protrusions LP1 and LP2 do not need to be physically intersecting to form the cross-grid structure as shown in FIG. 1.

The array of discrete protrusions (P, P') is a rectangular array of (M+1)×(N+1) discrete protrusions corresponding to the first network of intersecting grooves comprising M×N orthogonally intersecting longitudinal grooves (LG1, LG2; LG1' and LG2'). The second network of cylindrical protrusions comprises M×N orthogonally intersecting longitudinal cylindrical protrusions LP1 and LP2, to match the first network of M×N intersecting longitudinal grooves. In both embodiments depicted in FIGS. 2 and 4, M=10 and N=4 only for purposes of illustration. For a coupling interface between the first surface S1 of the optical connector 10 and the second surface S2 of the foundation 12 having a planar area of about 3 mm×4 mm, to achieve a coupling accuracy of less than 1 micrometer between the optical connector and the foundation, M is preferably in a range of 3 to 10 and N is in a range of 3 to 10.

Referring the embodiment of FIG. 2B, the discrete protrusions P defined by the network of intersecting longitudinal grooves LG1 and LG2 on the connector 10 contact the second surface S2 in the space between adjacent cylindrical protrusions LP1 of the foundation 12, when the optical connector 10 is coupled to the foundation 12. Similarly, in the embodiment of FIG. 4B, the discrete protrusions P' defined by the intersecting longitudinal grooves LG1' and LG2' on the connector 10 contact the second surface S2 in the space between adjacent cylindrical protrusions LP1 of the foundation 12, when the optical connector 10 is coupled to the foundation 12.

In one embodiment, referring to FIG. 1C, to ensure the optical connector 10 seats on the foundation 12 in a predetermined unique position, the array of discrete protrusions P further comprise a plurality of guide key protrusions GP having raised structures located along the perimeter/edge of the first surface S1, which have a different surface profile at the surfaces facing away from the perimeter/edge (i.e., the surfaces not contacting a cylindrical protrusion when the optical connector is coupled to the foundation) as compared to the surface profile of the symmetrical discrete protrusions P located interior of the perimeter/edge (i.e., the discrete protrusions P that contact the second surface S2 of the foundation 12. As depicted in FIG. 1C, the protrusions GP along the perimeter of the first surface S1 each has a straight wall surface W facing away from the perimeter. Given the wall surfaces W, the shape of the protrusions GP would not fit in the interior spaces bound by cylindrical protrusions LP1 and LP2 on four sides on the opposing surface S2. However, the protrusions GP would fit only into the spaces along the edges on the opposing surface S2 since the straight wall surfaces W are not bound by cylindrical protrusions at the edges.

Figure 5:
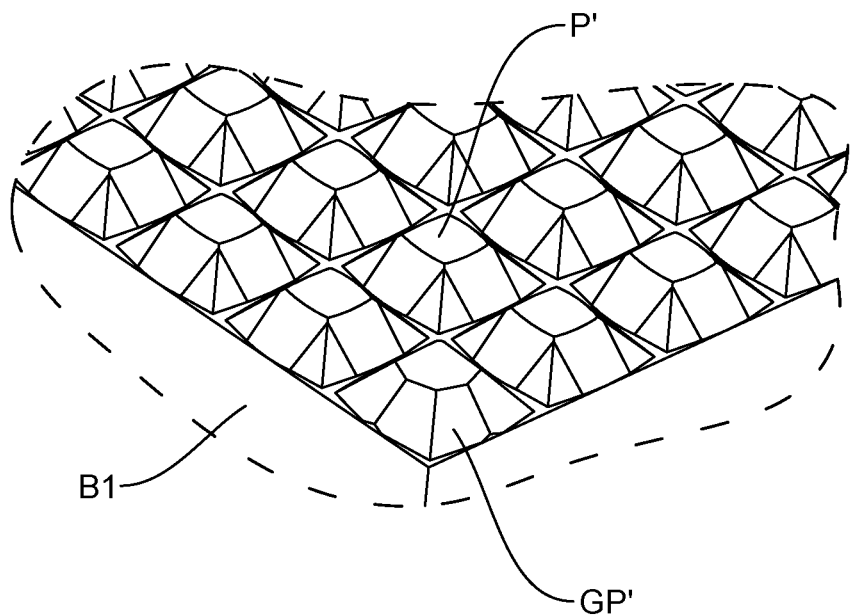
FIG. 5 illustrate guide key protrusions, in accordance with another embodiment of the present invention.

FIG. 5 illustrate an embodiment of guide key protrusions that may be implemented for convex protrusion surfaces GS' in the embodiment of FIG. 3. For example, for the illustrated 10×5 array of discreate protrusions P' (i.e., M=9 and N=4), the discrete protrusions GP' at the corners (1, 1), (10, 1), (1, 5) and (10, 5), may each include a surface profile at the surfaces facing away from the perimeter/edge as shown which is different from that of the discrete protrusions P' at interior locations away from the perimeter in the array (e.g., at (2, 2) to (9, 2), etc.). Given the shape of the corner protrusions GP', they would not fit in the interior spaces bound by cylindrical protrusions LP1 and LP2 on four sides on the opposing surface S2. The corner protrusions GP' would fit only into the spaces at the corners on the opposing surface S2 since they are not completely bound by cylindrical protrusions LP1 and LP2 at the corner.

Hence, guide keys such as GP and GP' can be provided at the coupling interface to guide the first array of alignment features F1 and the second array of alignment features F2 to uniquely seat the relative position of the complementary alignment features to couple the optical connector 10 to the foundation 12 in a predetermined intended relative position.

It is understood that alternatively, the longitudinal groove and longitudinal cylindrical protrusion alignment features disclosed in the above described embodiments may be swapped between the interfacing surfaces of the optical connector 10 and the foundation 12, without departing from the scope and spirit of the present invention.

In one embodiment, the first base B1 comprises a first malleable metal material and the first array of alignment features F1 of the optical connector 10 are integrally defined on the first base by stamping the malleable metal material, and the second base B2 comprises a second malleable material and the second array of alignment features F2 of the foundation are integrally defined on the base by stamping the second malleable metal material. In one embodiment, the first array of mirrors M1 and the first array of alignment features F1 are simultaneously defined on the first base by stamping a first body of metal blank and the second array of mirrors M2 and the second array of alignment features F2 are simultaneously defined on the second base by stamping a second body of metal blank. By high-precision stamping to integrally/simultaneously form the passive alignment features and/or the micro optical bench (MOB) on the foundation and the optical connector, the components can be produced economically in high or small volumes, while improving tolerance, manufacturability, ease of use, functionality and reliability. The foundation and/or optical bench components should be made of a stampable materials like ductile metals such as Kovar, Invar, stainless steel, aluminum. Preferably, the optical bench and foundation should both have similar coefficients of thermal expansion (CTEs), so that misalignment does not occur during temperature cycles and stress/strains are not generated.

FIGS. 6A and 6B illustrate positioning of a foundation 12 as an edge coupler to a PIC chip 100, in accordance with one embodiment of the present invention. As shown, the foundation 12 is butted against the PIC chip 100 or positioned with a gap between the edge of the base B2 of the foundation and the facing edge of the PIC chip 100 (as shown in FIG. 7C), with the cover SP2 extending over the PIC chip 100. In this embodiment, the foundation 12 is supported on the support S in optical alignment with respect to the PIC chip 100. The optical elements of the PIC chip 100 route light to an edge of the PIC chip 100. The foundation 12 functions as an edge coupler. As explained above, the array of mirrors M2 of the foundation 12 are in optical alignment with the optical elements of the PIC chip 100, and light is transmitted along a light path L3 between a mirror M2 in the mirror array and a corresponding optical element in the PIC chip 100.

In the embodiment shown in FIG. 6A, optical alignment of the mirrors M2 in the foundation 12 and the optical elements in the PIC chip 100 is achieved by passive alignment of the mirror M2 to the edge of the PIC chip based on fiducials V provided on an extended section of cover SP2 beyond the edge of the base B2 of the foundation 12 and fiducials (not shown) provided at a top surface near the edge of the PIC chip 100. The gap can be filled with a material that has an optical index of refraction that is similar to that of the core of the optical fiber and waveguide on the PIC chip 100. The foundation 12 is passively aligned to the PIC chip 100 by optically aligning the fiducials V on the cover SP2 to the fiducials (not shown) provided on the top surface of the PIC chip 100. In another embodiment, the foundation 12 may be an integral part of the PIC chip 100 or the support S for the PIC chip 100.

Figure 7A:
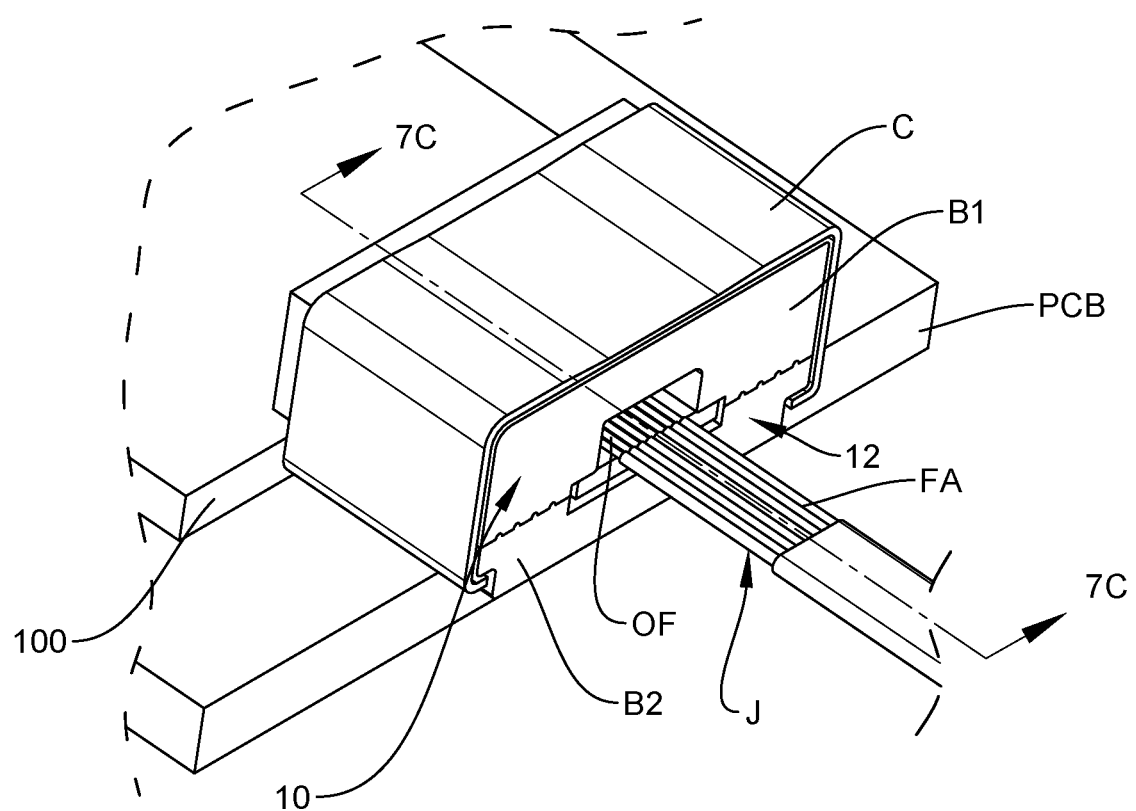
FIGS. 7A to 7C illustrate connection of an optical connector to the foundation, in accordance with one embodiment of the present invention.
Figure 7B:
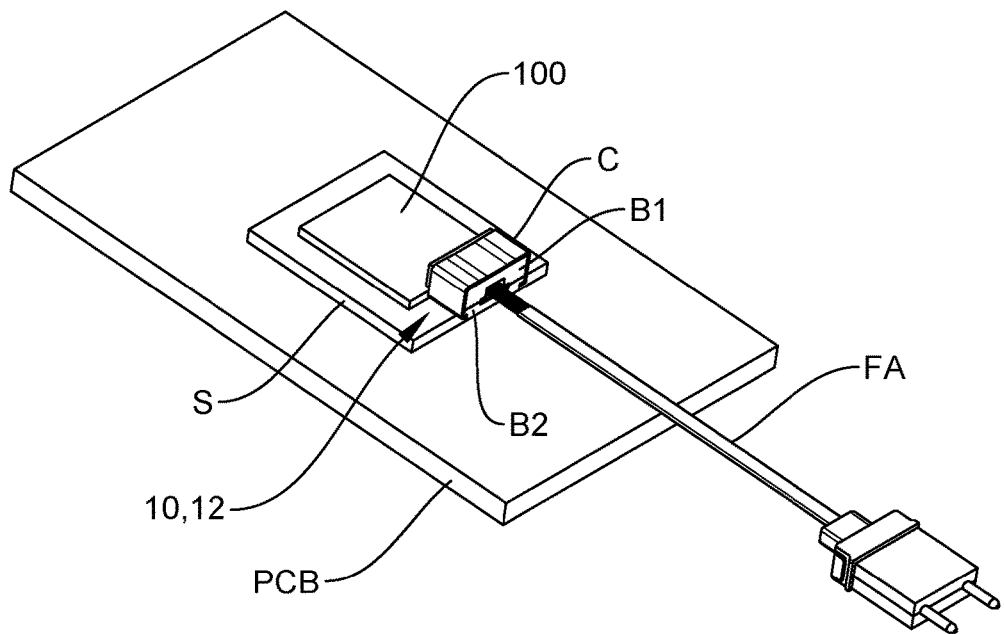
Figure 7C:
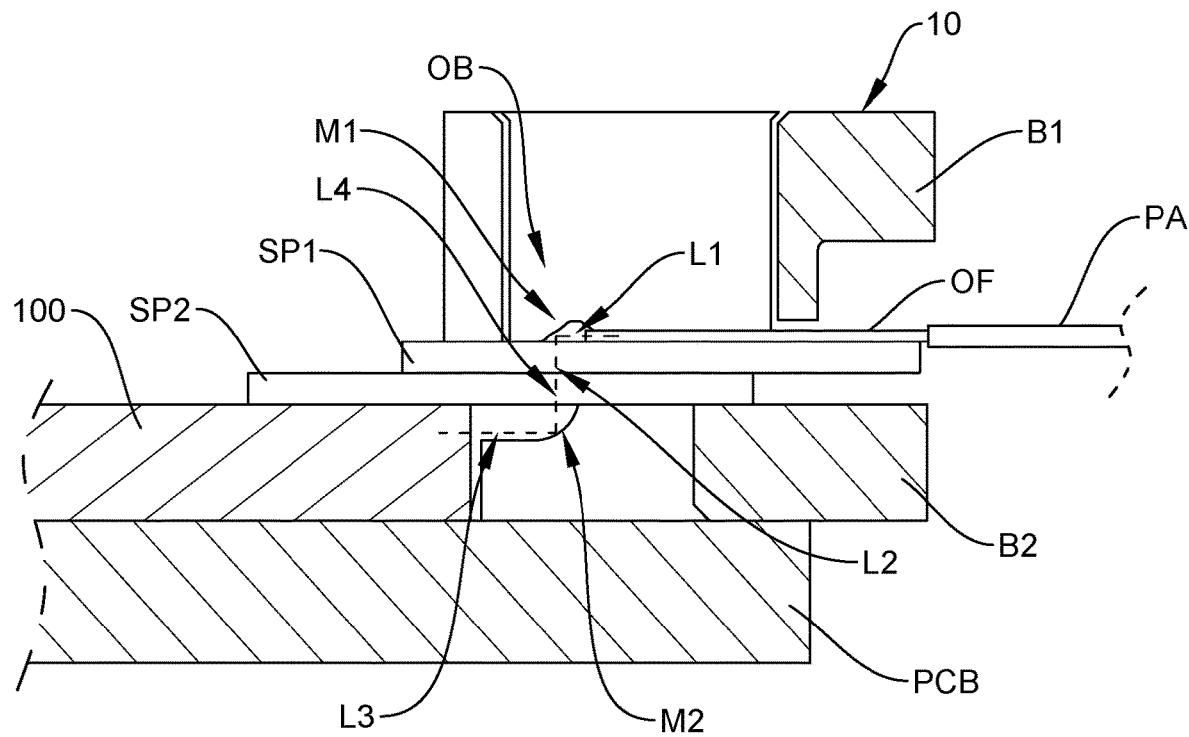

FIGS. 7A to 7C illustrate the connection of the optical connector 10 to the foundation 12, in accordance with one embodiment of the present invention. The PIC chip 100 is supported on a support S (which may be a submount, interposer), which may be supported on a printer circuit board PCB in FIG. 7B. The first base B1 of the optical connector 10 has a first reference surface R1 at least at one side of the first base B1 and the second base B2 of the foundation 12 has at least a second reference surface R2 at a second side of the second base B2. The first reference surface R1 and the second reference surface R2 are generally aligned by a compliant clip C biasing the first base B1 against the second base B2 with the first array of alignment features F1 seated against the second array of alignment features F2. In FIG. 7B, the optical fiber array FA may be a fiber-optic jumper cable to provide a flexible optical connection for optical signal communication with the PIC chip 100.

FIG. 7C is a sectional view taken along line 7A-7A in FIG. 7A. The mirrors M1 each includes a structured reflective surface profile that turns light (e.g., by 90 degrees) between a first light path L1, along a first direction in a first plane substantially parallel to the first surface S1 of the first base B1 of the connector 10, and a second light path L2, along a second direction outside the first plane. The array of fiber grooves G defined on the first base B1 each supports an end section of optical fiber OF in optical alignment with a corresponding mirror M1 along the first light path L1. The second array of mirrors M2 defined on the second base B2 of the foundation each includes a structured reflective surface profile that turns light between a third light path L3 along a third direction in a second plane substantially parallel to the second surface S2 of the second base B2, and a fourth light path L4 along a fourth direction outside the second plane. The light paths L3 and L4 coincide upon coupling the connector 10 and foundation 12 in the configuration shown, so that a light path is completed between the PIC chip 100 and the optical fibers OF in the fiber array FA.

The structured reflective surface profile of the mirrors M1 and/or mirrors M2 may be configured to reshape the light beam from the PIC chip 100 to produce a mode field that more closely match the mode field of the optical fibers OF in the connector 10. Further, the mirrors M2 in the foundation 12 may be configured with a reflective surface profile to expand or collimate the light beams from the optical elements in the PIC chip 100 and output to the mirrors M1 in the connector 10, and the mirrors M1 in the connector 10 may be configured with a reflective surface profile to focus the light beams from the mirrors M2 in the foundation 12 to focus on the core of the tip/end face of the optical fiber OF held in the grooves G on the base B1 of the optical bench in the connector 10. This expanded beam optical coupling configuration would reduce optical alignment tolerance requirement between the mirrors M2 and the optical fibers OF held in the connector 10.

Figure 8A:
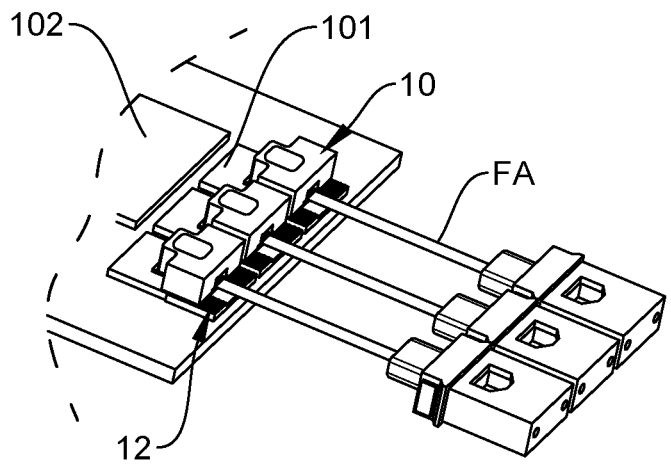
FIGS. 8A to 8D illustrate a process of securing position of the foundation for subsequent demountable connection, in accordance with one embodiment of the present invention.
Figure 8B:
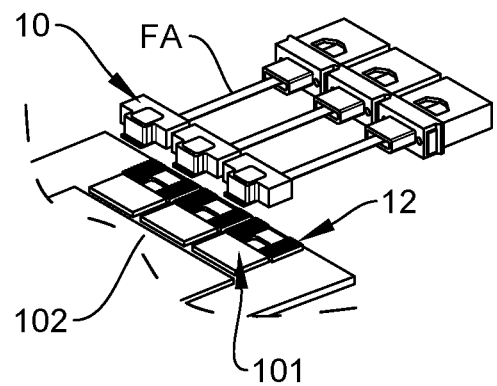
Figure 8C:
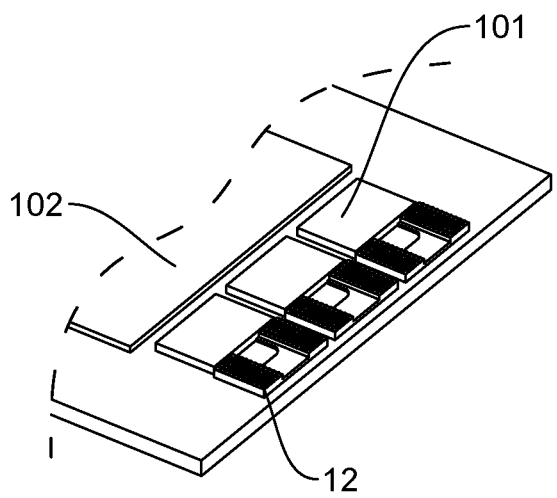
Figure 8D:
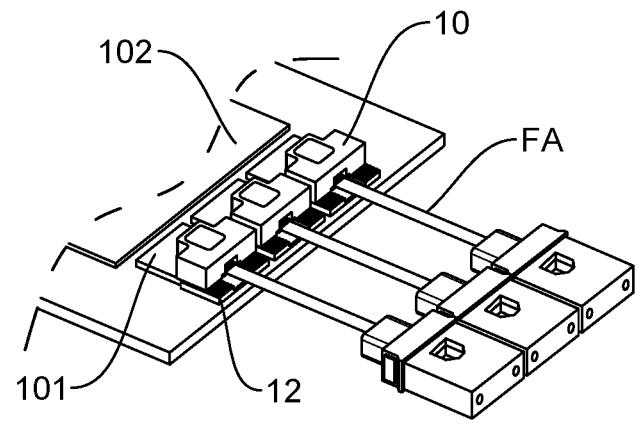

FIGS. 8A to 8D illustrate a process of securing position of the foundation 12 for subsequent demountable connection, in accordance with one embodiment of the present invention. In this embodiment, additional I/O chips 101 are provided to interface with the ASIC (e.g. CPU, GPU, switch ASIC) chip 102. The optical path is similar to the optical path shown in FIG. 7C, with the I/O chip 101 replacing the PIC chip 100. The optical connector 10 is first coupled to the foundation 12 in FIG. 8A. The optical connector 10 is actively aligned to a chip 101 by positioning the foundation 12 relative to the chip 101 to obtain an optimum optical signal between the chip 101/chip 102 and the optical fibers OF supported by the optical connector 10. The location of the foundation 12 is secured with respect to the chip 101 at the optically aligned position (e.g., using a solder to tack the position of the foundation 12 on the support S for the chip 101 (such as an interposer, a printed circuit board, a submount, etc.). In FIG. 8B, the optical connector 10 is then demounted from the foundation 12. In FIG. 8C, the foundation 12 can be permanently attached to the support S (e.g., reflowing the solder) without changing its position on the support S. Thereafter, in FIG. 8D, the optical connector 10 can be repeatedly connected and disconnected and reconnected to the foundation 12, non-destructively and without losing the original optical alignment obtained by active alignment between the optical connector 10 and the chip 101/chip 102. Optical alignment in accordance with original active alignment is maintained for each connect and disconnect and reconnect, to precisely and accurately align the optical connector 10 to the foundation 12.

In accordance with the present invention, the optical connector and the foundation define a free space coupling without any refractive optical element disposed between the optical connector and the foundation to provide reshaping of light. Further, the demountable elastic averaging coupling between the optical connector and the foundation is defined without use of any complementary alignment pin and alignment hole.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:

1. A passive optical alignment coupling, comprising:
an optical connector comprising a first body transmitting an optical signal, wherein the first body defines a first base having a first, planar, surface defined with a first two-dimensional planar array of alignment features integrally defined on the first surface of the first base,
a foundation comprising a second body providing an alignment reference to the optical connector, wherein the second body defines a second base having a second, planar, surface defined with a second two-dimensional planar array of alignment features integrally defined on the second surface of the second base,
wherein one of the first array of alignment features and the second array of alignment features comprises a first network of orthogonally intersecting longitudinal grooves, and another one of the first array of alignment features and the second array of alignment features comprises a second network of longitudinal cylindrical protrusions each having a longitudinal axis parallel to corresponding one of the first surface of the first base or the second surface of the second base,
wherein the second network of cylindrical protrusions are received in the first network of grooves, with protrusion surfaces of the cylindrical protrusions in contact with groove surfaces of the grooves, and
wherein the optical connector is removably attachable to the foundation to define a demountable coupling, with the first array of alignment features against the second array of alignment features to define an elastic averaging coupling, thereby aligning the optical connector to the foundation.

2. A passive alignment coupling, comprising:
a first body defining a first base having a first, planar, surface defined with a first two-dimensional planar array of alignment features integrally defined on the first surface of the first base,
a second body providing an alignment reference to the first body, wherein the second body defines a second base having a second, planar, surface defined with a second two-dimensional planar array of alignment features integrally defined on the second surface of the second base,
wherein one of the first array of alignment features and the second array of alignment features comprises a first network of orthogonally intersecting longitudinal grooves, and another one of the first array of alignment features and the second array of alignment features comprises a second network of longitudinal cylindrical protrusions each having a longitudinal axis parallel to corresponding one of the first surface of the first base or the second surface of the second base,
wherein the second network of cylindrical protrusions are received in the first network of grooves, with protrusion surfaces of the cylindrical protrusions in contact with groove surfaces of the grooves, and
wherein the first body is removably attachable to the second body to define a demountable coupling, with the first array of alignment features against the second array of alignment features to define an elastic averaging coupling, thereby aligning the first body to the second body.

3. The passive alignment coupling as in claim 2, wherein the first network of orthogonally intersecting longitudinal grooves of the first alignment features define an array of discrete protrusions separated and isolated from one another by the orthogonally intersecting longitudinal grooves on the corresponding one of the first surface of the first base and the second surface of the second base, which are each in a generally pyramidal shape with a truncated top.

4. The passive alignment coupling as in claim 3, wherein the array of discrete protrusions comprise raised structures each symmetrical with respect to a first plane orthogonal to the corresponding one of the first surface of the first base and the second surface of the second base and further symmetrical with respect to a second plane orthogonal to the first plane and orthogonal to the corresponding one of the first surface and the second surface.

5. The passive alignment coupling as in claim 4, wherein the array of discrete protrusions further comprise a plurality of key guide protrusions having raised structures located along a perimeter/an edge of the corresponding one of the first surface and the second surface, which have a different surface profile at the surfaces facing away from the perimeter/edge as compared to that of the symmetrical discrete protrusions located interior of the perimeter/edge, thereby to initially guide the relative position of the first and second arrays of alignment features to uniquely seat the relative position of the first body having the first array of alignment features and the second body having the second array of alignment features to couple the first body to the second body in a predetermined, intended relative position.

6. The passive alignment coupling as in claim 3, wherein the array of discrete protrusions is a rectangular array of (M+1)×(N+1) discrete protrusions, wherein the first network of intersecting grooves comprises M×N orthogonally intersecting longitudinal grooves, and wherein M is preferably in a range of 3 to 10 and N is in a range of 3 to 10 for a coupling interface between the first body and the second body having a planar area of about 3 mm×3 mm, so as to achieve a coupling accuracy of less than 1 micrometer between the first body and the second body.

7. The passive alignment coupling as in claim 3, wherein the discrete protrusions defined by the longitudinal grooves contact the corresponding one of the first surface and the second surface, when the first body is coupled to the second body.

8. The passive alignment coupling as in claim 2, wherein the protrusion surfaces of the longitudinal cylindrical protrusions are in line contact with the groove surfaces to define an array of line contacts when the first body is coupled to the second body, and wherein the longitudinal grooves are V-grooves, and wherein each discrete protrusion comprises substantially flat surfaces corresponding to the groove surfaces so as define the line contacts with the protrusion surfaces when the first body is coupled to the second body.

9. The passive alignment coupling as in claim 2, wherein the protrusion surfaces of the longitudinal cylindrical protrusions are in point contact with the groove surfaces to define an array of point contacts when the first body is coupled to the second body, and wherein each discrete protrusion comprises convex curved surfaces corresponding to the groove surfaces so as to define the point contacts with the protrusion surfaces when the first body is coupled to the second body.

10. The passive alignment coupling as in claim 2, wherein the second network of cylindrical protrusions comprises a network of intersecting longitudinal cylindrical protrusions.

11. The passive alignment coupling as in claim 10, wherein the second network of cylindrical protrusions comprises M×N orthogonally intersecting longitudinal cylindrical protrusions, matching the first network of intersecting longitudinal grooves.

12. The passive alignment coupling as in claim 2, wherein the second network of cylindrical protrusions are each substantially semi-circular in cross-section.

13. The passive alignment coupling as in claim 2, wherein the first base comprises a first malleable metal material and the first array of alignment features of the first body is integrally defined on the first base by stamping the malleable metal material, and the second base comprises a second malleable material and the second array of alignment features is integrally defined on the base by stamping the second malleable metal material.

14. The passive alignment coupling as in claim 2, wherein the first body comprises a first micro-mirror optical bench, which comprises:
  the first base;
  a first array of mirrors defined on the first base, wherein each mirror includes a structured reflective surface profile that turns light between a first light path, along a first direction in a first plane substantially parallel to the first surface of the first base, and a second light path, along a second direction outside the first plane; and
  an array of fiber grooves defined on the first base each receiving a section of optical fiber with its longitudinal axis along the first light path, with an end in optical alignment with a corresponding mirror along the first light path.

15. The passive alignment coupling as in claim 14, wherein the second body comprises a second micro-mirror optical bench, which comprises:
  the second base; and
  a second array of mirrors defined on the second base, wherein each mirror in the second array of mirrors includes a structured reflective surface profile that turns light between a third light path, along a third direction in a second plane substantially parallel to the second surface of the second base, and a fourth light path, along a fourth direction outside the second plane.

16. The passive alignment coupling as in claim 15, further comprising a compliant clip biasing the first body against the second body with the first array of alignment features against the second array of alignment features.

17. The passive alignment coupling as in claim 15, wherein the first array of mirrors is simultaneously defined with the first array of alignment features on the first base and the second array of mirrors is simultaneously defined with the second array of alignment features on the second base.

18. The passive alignment coupling as in claim 14, wherein the first body is comprised in an optical connector transmitting an optical signal.

19. The passive alignment coupling as in claim 18, wherein the second body is comprised in a foundation providing an optical alignment reference.

20. The passive alignment coupling as in claim 19, wherein the foundation provides an optical alignment reference to an external optoelectronic device.

21. The passive alignment coupling as in claim 2, wherein the first body and the second body define a free space coupling without any refractive optical element disposed between the first body and the second body.

22. The passive alignment coupling as in claim 2, wherein the demountable coupling between the first body and the second body is defined without use of any complementary alignment pin and alignment hole.

23. The passive alignment coupling as in claim 2, wherein at least one of the first body and the second body comprises at least one optical waveguide.

\* \* \* \* \*